(12) United States Patent
Riegraf

(10) Patent No.: US 10,919,591 B2
(45) Date of Patent: Feb. 16, 2021

(54) TRANSPORT SYSTEM

(71) Applicant: EISENMANN SE, Böblingen (DE)

(72) Inventor: Martin Riegraf, Reutlingen (DE)

(73) Assignee: EISENMANN SE, Böblingen (DE)

( * ) Notice: Subject to any disclaimer, the term of this patent is extended or adjusted under 35 U.S.C. 154(b) by 104 days.

(21) Appl. No.: 16/315,381

(22) PCT Filed: Jun. 13, 2017

(86) PCT No.: PCT/EP2017/064458
§ 371 (c)(1),
(2) Date: Jan. 4, 2019

(87) PCT Pub. No.: WO2018/007110
PCT Pub. Date: Jan. 11, 2018

(65) Prior Publication Data
US 2019/0233037 A1 Aug. 1, 2019

(30) Foreign Application Priority Data

Jul. 5, 2016 (DE) .................. 10 2016 112 324

(51) Int. Cl.
| | |
|---|---|
| *B62D 65/18* | (2006.01) |
| *F26B 15/14* | (2006.01) |
| *F26B 25/02* | (2006.01) |
| *B61B 10/00* | (2006.01) |

(52) U.S. Cl.
CPC .............. *B62D 65/18* (2013.01); *F26B 15/14* (2013.01); *F26B 25/02* (2013.01); *B61B 10/00* (2013.01); *F26B 2210/12* (2013.01)

(58) Field of Classification Search
CPC .......... B62D 65/18; F26B 25/02; F26B 15/14; F26B 2210/12; B61B 10/00
See application file for complete search history.

(56) References Cited

U.S. PATENT DOCUMENTS

| | | | |
|---|---|---|---|
| 5,014,625 A | 5/1991 | Murai et al. | |
| 6,324,992 B1 | 12/2001 | Morikiyo et al. | |
| 6,494,142 B2 | 12/2002 | Masugaki et al. | |
| 6,679,185 B2 * | 1/2004 | Sullivan ................ | B61B 10/046 104/172.1 |

(Continued)

FOREIGN PATENT DOCUMENTS

| | | |
|---|---|---|
| AT | 408 749 | 2/2002 |
| AT | 509 670 | 10/2011 |

(Continued)

*Primary Examiner* — Rich K Chang
(74) *Attorney, Agent, or Firm* — Schroeder Intellectual Property Law Group, LLC

(57) ABSTRACT

A transport system, which is designed in particular for a dryer for drying workpieces, such as vehicle bodies, and which has a plurality of transport carts. The transport carts can be moved on a rail system in a transport direction. Workpieces can be transported by means of the transport carts. Each transport cart has a transport cart chassis. The transport cart has a fastening device, which is designed to establish a connection between the transport cart and a workpiece carrier in order to transport the workpiece carrier by means of the transport cart. The fastening device has thermal insulation, which impedes heat transfer between a workpiece carrier and the transport cart.

9 Claims, 4 Drawing Sheets

(56) References Cited

U.S. PATENT DOCUMENTS

| | | |
|---|---|---|
| 7,874,058 B2 | 1/2011 | Kodo et al. |
| 2002/0108530 A1 | 8/2002 | Masugaki et al. |
| 2003/0159614 A1 | 8/2003 | Sullivan et al. |
| 2008/0247847 A1 | 10/2008 | Muller et al. |
| 2009/0013524 A1 | 1/2009 | Kodo et al. |

FOREIGN PATENT DOCUMENTS

| | | |
|---|---|---|
| CN | 11 70 748 C | 10/2004 |
| CN | 101 048 312 A | 10/2007 |
| CN | 102 072 624 A | 5/2011 |
| DE | 28 04 529 | 8/1979 |
| DE | 10 2004 011 254 | 9/2005 |
| DE | 10 2004 024 614 | 12/2005 |
| DE | 10 2011 110 986 | 2/2013 |
| EP | 1 232 967 | 8/2002 |
| EP | 2 325 591 | 5/2011 |
| EP | 3 009 322 | 4/2016 |
| JP | S59 171748 | 9/1984 |
| JP | 2002 347610 | 12/2002 |

* cited by examiner

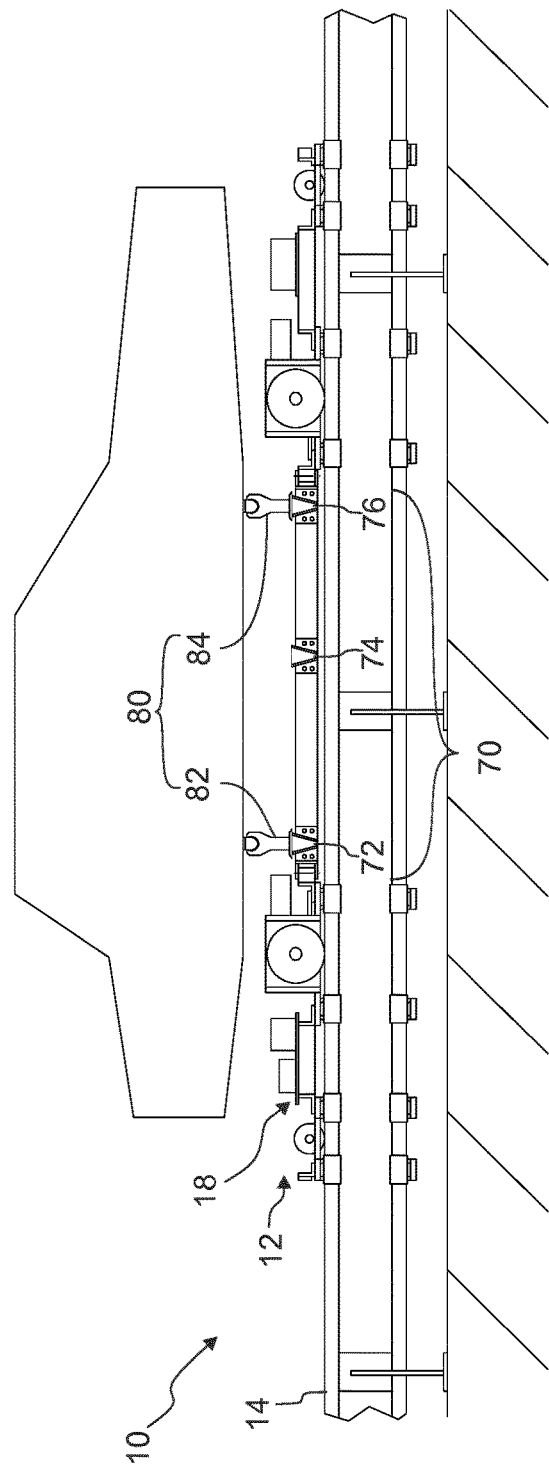
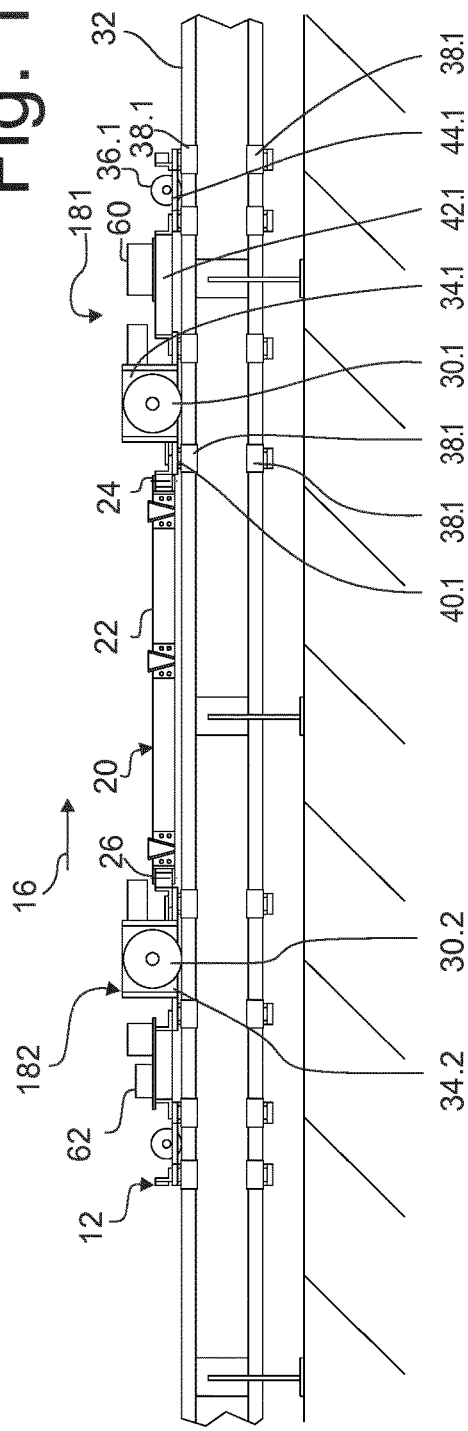

TRANSPORT SYSTEM

RELATED APPLICATIONS

This application is a national phase of International Patent Application No. PCT/EP2017/064458 filed Jun. 13, 2017, which claims priority to German Patent Application No. 10 2016 112 324.2 filed Jul. 5, 2016—the contents of both of which are incorporated herein by reference.

BACKGROUND OF THE INVENTION

1. Field of the Invention

The invention relates to a transport system, in particular for a drier for drying workpieces, having a multiplicity of transport carts, wherein the transport carts can be displaced in a transporting direction on a rail system and workpieces can be transported by means of the transport carts, wherein each transport cart has a chassis.

2. Description of the Prior Art

The automotive industry uses workpiece carriers in order to link different production processes, for example coating, drying, etc. So-called skids are available for vehicle bodies. The workpieces, for example vehicle bodies or vehicle components, are fastened on these workpiece carriers for transportation purposes. The workpieces pass through the different treatment stations along with the workpiece carriers and, in some cases here, are exposed to high temperatures or reactive substances.

It is usually a transport system such as, for example, a roller conveyor, a chain-conveyor system or a rail-bound transport system which is used in order to transport the goods carriers. A rail-bound transport system often makes use of a multiplicity of transport carts, the individual transport carts being individually motorized. This makes it possible to realize individual transporting cycles and/or cycle times for the individual transport carts and, therefore, a high level of flexibility in the design of the of the transport system as a whole.

The skids, which are used specifically for vehicle bodies, weigh a not inconsiderable amount in comparison with the weight of the vehicle bodies and are designed to some extent for specific treatment processes such as, for example, dip coating of the vehicle bodies. Since it is necessary for the weight of the skids to be, for example, heated as well throughout the wide variety of different treatment processes, the aim is to do away with this kind of workpiece carrier, wherever, and as far as, this is possible. At the same time, different workpiece carriers have to be used for different types of body and different treatment techniques. In order for a treatment process to be adapted to different types of body, it is usually necessary to provide a corresponding number of appropriate workpiece carriers.

A further problem arises from the fact that, during the treatment of workpieces for example at high temperatures, the associated transport cart is heated as well and, as a result, ages at a correspondingly quicker rate or generates a higher level of maintenance outlay.

SUMMARY OF THE INVENTION

The invention is therefore based on the object of specifying a transport system which has a multiplicity of transport carts, protects the individual transport carts against harmful influences as a result of treatment of a workpiece assigned to the transport cart and, if possible, at the same time provides a straightforward, reliable and cost-effective means for adaptation to workpieces of different sizes.

This object is achieved by a transport system, in particular for a drier for drying workpieces, having a multiplicity of transport carts, wherein the multiplicity of transport carts can be displaced in a transporting direction on a rail system and workpieces can be transported by means of the multiplicity of transport carts, wherein each transport cart has a chassis. Each transport cart has a fastening device, which is intended to establish a connection between the transport cart and a workpiece carrier in order for the workpiece carrier to be transported, and the fastening device has a thermal insulating means, which impedes transfer of heat between the workpiece carrier and the transport cart. Further configurations of the invention are specified herein.

The transport system according to the invention is designed, in particular, for a drier for drying workpieces, for example vehicle bodies, and has a multiplicity of transport carts. The transport carts can be displaced in a transporting direction on a rail system. Workpieces can be transported by means of the transport carts. Each transport cart has a chassis.

Provision is made, according to the invention, for the transport cart to have a fastening device, which is intended to establish a connection between the transport cart and a workpiece carrier in order for the workpiece carrier to be transported by means of the transport cart.

The fastening device has a thermal insulting means, which impedes transfer of heat between a workpiece carrier and the transport cart. It is thus possible to carry out thermal processes on a workpiece carrier, with a workpiece possibly fastened thereon, and at the same time to protect the transport cart against harmful thermal influences. It is preferably the case that the thermal insulating means protects the transport cart against excessively high temperatures.

In the case of a preferred embodiment, provision is made for the fastening device, for the thermal insulating means, to have a thermally insulating element between the workpiece carrier and the fastening device, between the fastening device and the transport cart and/or integrated in the fastening device. This constitutes an efficient measure of impeding the flow of heat between the transport cart and the workpiece carrier.

It is particularly preferable for the fastening device to have a through-passage element. The through-passage element may be, for example a swan-neck-like or tongue-like formation of part of the fastening device, which allows the workpiece carrier to be guided through a correspondingly narrow slot. This may be advantageous, in particular, in a drying apparatus. In such a case, it is possible, by means of the through-passage element, for the workpiece carrier to be guided through a narrow slot within the drier interior subjected to high temperature, while at the same time the transport cart stays outside the drier interior subjected to increased temperature. The thermal insulating means, which is connected to the fastening device, can impede the flow of heat taking place here via the through-passage element and can thus protect the transport cart against excessively high thermal loading.

According to a further advantageous embodiment, provision is made for the fastening device to have a plug-in connection. The plug-in direction preferably encloses an angle of 0°±45°, in particular of 0°±30° and particularly preferably of 0°±15°, with the vertical. The plug-in direction particularly preferably runs vertically. A plug-in connection constitutes a quick-to-establish and quick-to-release connection which, in particular, also makes it possible to provide a workpiece carrier adapted to the respective workpiece and to connect said workpiece carrier to the transport cart, via the fastening device, for the respective use purpose.

The fastening device preferably has an accommodating space, which tapers downward. This allows the workpiece carrier to be connected in a straightforwardly releasable manner in the transport cart. At the same time, the conical tapering provides a particularly high level of accuracy for the plug-in operation. The fastening device is particularly preferably designed in the form of a pocket. As an alternative, the accommodating space can also have vertical walls.

In this context, provision can be made in a particularly advantageous manner for the fastening device to have a thermally insulating element in the region of the accommodating space. This makes it possible to inhibit, or largely interrupt, the flow of heat directly at the transition from a workpiece carrier to the fastening device, and thus to the transport cart.

In an advantageous further development of the invention, provision may be made for the insulating element to have friction-reducing properties. The combination of thermal insulating means and friction reduction provides for a connection between the workpiece carrier and transport cart which can be released and established particularly straightforwardly and, on account of the friction-reduced properties, can be released to particularly good effect and, at the same time, impedes through-passage of the flow of heat.

In a development of the invention, provision is made for the transport cart to have different fastening points for the fastening device. In particular, it is advantageous if the fastening points differ in respect of their position along the transporting direction. It is thus, for example, possible for multi-part workpiece carriers to be fastened on the transport cart, in different arrangements along the transporting direction, by means of the fastening device if appropriate fastening points are present on the transport cart. For example, the fastening points can be arranged on a rail by means of a fastening clamp. It is thus possible for the fastening device to be fitted on the transport cart in a transition-free or stepless manner along the transporting direction. The fastening clamp can also be used, to adjust, if appropriate, further dimensions, for example in a direction perpendicular to the transporting direction. As an alternative to a fastening clamp, predetermined fastening in the form of predefined accommodating locations is also possible.

In the case of one embodiment of the transport system, the transport system can be designed in the form of a monorail system. The workpiece carrier can be a skid for a vehicle body or a vehicle component.

BRIEF DESCRIPTION OF THE DRAWINGS

Exemplary embodiments of the invention will be explained in more detail hereinbelow with reference to the drawings, in which:

FIG. 1 shows a schematic side view of a transport system according to the invention with a plugged-in workpiece carrier together with a workpiece;

FIG. 2 shows the transport system from FIG. 1 without the workpiece carrier inserted;

DESCRIPTION OF PREFERRED EXEMPLARY EMBODIMENTS

Figure 3:
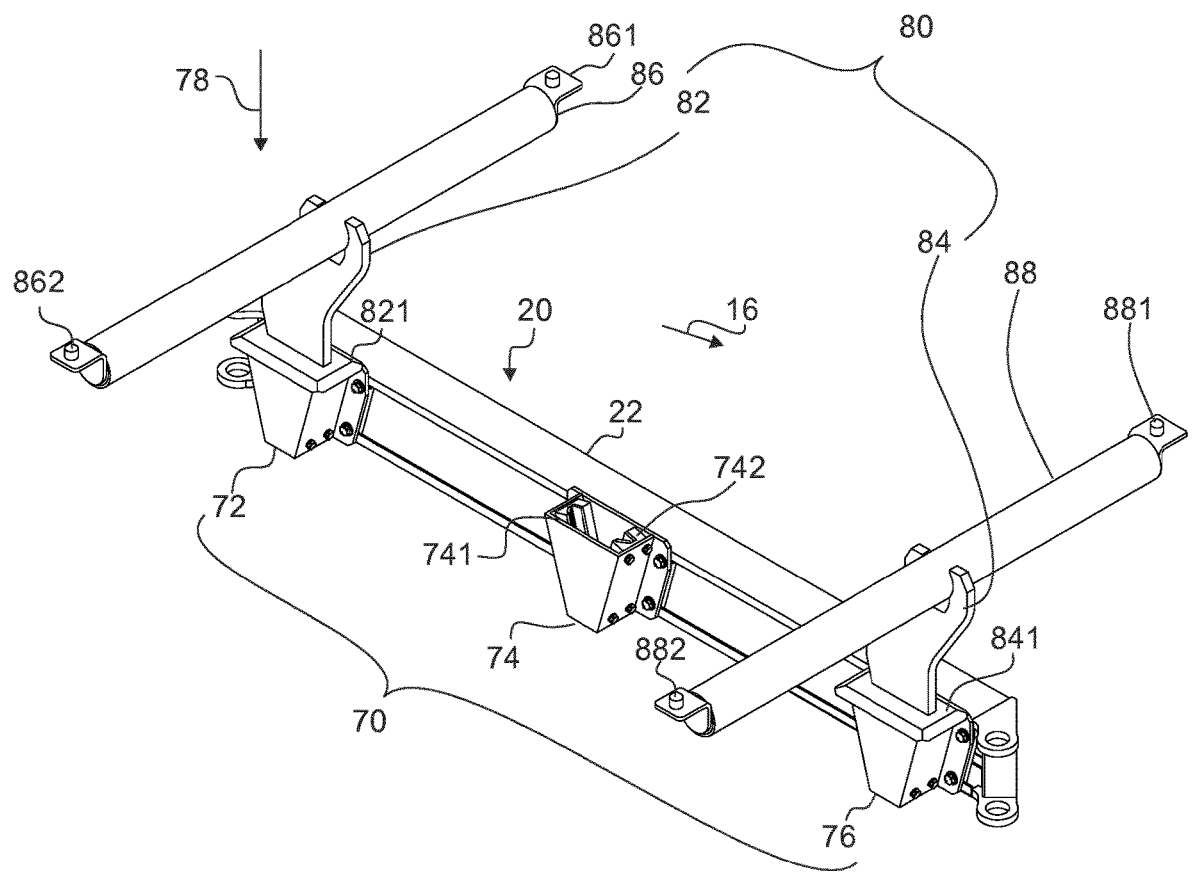
FIG. 3 shows a partial view, in perspective, of a transport cart of the transport system from FIG. 1 with a first workpiece carrier inserted.

FIGS. 1 and 2 show schematic side views of a transport system 10 according to the invention. The transport system 10 comprises a multiplicity of conveying units or transport carts, of which one transport cart 12 is illustrated in FIGS. 1 and 2. The transport system 10 is designed in the form of a monorail system and comprises a rail 14, on which the transport cart 12 is arranged in a displaceable manner. The transport cart 12 can be displaced in the transporting direction along the rail 14, as is illustrated schematically by the arrow 16 in FIG. 2. In general, however, the transport cart 12 illustrated in FIGS. 1 and 2 can be used to convey in the forward and rearward directions.

The transport cart 12 has a chassis 18, which engages around the rail 14. In the case of the embodiment illustrated in FIGS. 1 and 2, the chassis 18 is designed in two parts and has a leading unit 181, as seen in the transporting direction, and a trailing unit 182, as seen in the transporting direction.

The leading unit 181 and the trailing unit 182, which together form the chassis 18 of the transport cart, are connected to one another via a connecting device 20. The chassis 18 of the transport cart runs on the carrying rail 14 and bears the connecting device 20.

The leading unit 181 and the trailing unit 182 are coupled via the connecting device 20. The coupling is configured such that the transport cart 12 is also capable of traveling through curved portions of the carrying rail 14. In the case of the present exemplary embodiment, the connecting device 20, which is designed here in the form of a horizontally running supporting crossmember 22, comprises two joints 24, 26, which couple the leading unit 181 and the trailing unit 182 to the connecting device 20 in an articulated manner. The joints 24, 26 make it possible for the connecting device 20 to be able to pivot about a vertical axis of rotation in relation to the leading unit 181 and the trailing unit 182.

The leading unit 181 and the trailing unit 182 are largely identical, and individual components, as seen on a rectilinear portion of the carrying rail 14, are positioned in a mirrored state in relation to a plane perpendicular to the transporting direction 16. Components of the leading unit 181 and of the trailing unit 182 which correspond to one another bear the same reference signs followed by ".1" and ".2", respectively. The leading unit 181 forms a chassis unit 28.1 and the trailing unit 182 forms a chassis unit 28.2 of the chassis 18 of the transport cart 12.

The leading unit 181 will now be explained hereinbelow. What is said in relation to the leading unit applies analogously to the trailing unit 182. The leading unit 181 bears a drive roller 30.1, which rolls on a drive surface 32 of the carrying rail 14 and is driven by means of a drive motor 34.1. The drive motor 34.1 is carried along by the leading unit 181. In the case of the present exemplary embodiment, the drive surface 32 of the carrying rail 14 is the surface on the upper side of the carrying rail 14, designed in the form of an I-shaped profile, and, accordingly, runs horizontally in likewise horizontal portions of the carrying rail 14. In the case of embodiments which are not shown specifically, the drive surface 32 can also be inclined or vertical. In such a case, the drive roller 34.1, in the form of a friction wheel, pushes laterally against the carrying rail 14.

The transport carts 12 each carry along a dedicated drive system, and therefore the transport carts 12 can be driven, and displaced, independently of one another. In the case of the present exemplary embodiment, the dedicated drive system is formed by the drive rollers 30.1, 30.2 and the associated drive motors 34.1, 34.2.

Alongside the transport carts 12 with dedicated drive system which are explained here, it is also possible, if appropriate, to have other transport carts which are driven by a central drive system. For example, such a central drive system can be formed by a chain hoist or the like. Accordingly, the transport carts explained here can also be driven, and displaced, independently of other drive devices.

At a distance from the drive roller 30.1, the leading unit 181 has a supporting roller 36.1, which runs along passively and likewise rolls on the drive surface 32 of the carrying rail 14. It is also the case that the chassis unit of the leading unit 181 bears a plurality of lateral guide rollers 38.1, of which just two are provided with reference signs. The guide rollers 38.1 butt against the carrying rail 14 from either side and thus prevent the leading unit 181 from tilting to the side.

In the case of the exemplary embodiment shown, the leading unit 181 has a drive frame 40.1, which bears the drive roller 30.1 together with the drive motor 34.1 and, on either side of the carrying rail 14, in each case four guide rollers 38.1. The drive frame 40.1 is connected to a supporting frame 44.1 in an articulated manner via a connecting crossmember 42.1, said supporting frame, for its part, bearing the supporting roller 36.1 and, likewise on either side of the carrying rail 14, in each case four guide rollers 38.1, as already mentioned above. The articulated connection between the drive frame 40.1 and the supporting frame 44.1 is achieved via coupling joints, which are not provided specifically with a reference sign and allow travel through curved portions of the carrying rail 14.

In the case of the exemplary embodiment shown, both the leading unit 181 and the trailing unit 182 each have a drive roller 30.1, 30.2. In the case of an alternative embodiment which is not illustrated specifically, it may be sufficient if a drive roller with drive motor is present just on the leading unit 181 or on the trailing unit 182. In any case, the chassis 18 of the transport cart 12 bears at least one drive roller and carries along the drive motor of the transport cart.

The transport cart carries along an energy-supply device 60 in order to supply energy to the drive motors 34.1, 34.2 of the leading unit 181 and of the trailing unit 182. The energy-supply device 60 ensures that energy is supplied to the drive motors 38.1, 38.2 during travel, i.e. as the transport cart 12 is moving. The energy-supply device 60 can be, for example, a rechargeable energy-storage device, for example a rechargeable battery or a capacitor for an electric drive or a compressed-gas storage tank forming an energy source for compressed-gas drives. As an alternative, or in addition, it is possible for line conductors to be fitted (not depicted) along the rail 14. The line conductors are in the form of a winding which has been stretched out to form a long conductor loop and describes a loop with a first line conductor forming a forward line and a second line conductor forming a return line. Energy is transferred via a coil on the chassis unit, said coil being arranged in the immediate vicinity of the line conductors without being in contact therewith. As an alternative, it is also possible to provide conductor-line systems which are known per se.

The trailing unit 182 carries a control device 62, by means of which the drive motors 34.1, 34.2 are activated and synchronized. The control device 62 communicates with a central controller of the installation 10, said central controller not being shown specifically.

The transport system 10 has a fastening device 70, which is intended to establish a connection between the transport cart 12 and a workpiece carrier 80 in order for the workpiece carrier 80 to be transported. In the exemplary embodiment shown, the fastening device comprises three accommodating pockets 72, 74, 76, which are arranged on the supporting crossmember 22 in a distributed state along the conveying direction 16. The accommodating pockets 72, 74, 76 interact with the workpiece carrier 80, which has two supporting portions 80, 84, which each interact with an accommodating pocket 72, 74, 76. FIG. 1 shows the workpiece carrier 80 plugged into the fastening device 70; FIG. 2 shows the fastening device without a workpiece carrier. For a more detailed explanation of the fastening device 70, reference will now be made to FIG. 3.

FIG. 3 shows a partial view, in perspective, of the transport cart 12 of the transport system 10 from FIG. 1 with a workpiece carrier 70 inserted. FIG. 3 details the supporting crossmember 22, acting in the form of a connecting device 20, with accommodating pockets 72, 74, 76 fastened thereon. The accommodating pockets 72, 74, 76 are arranged one behind the other in the conveying direction 16 and, in the embodiment shown, run conically in the plug-in direction, i.e. in the vertical direction 78. It is also possible for the accommodating pockets to follow other courses, for example a rectilinear course.

The accommodating pockets 72, 74, 76 taper downward in the vertical direction. The supporting crossmember 22 is designed in the form of a C-shaped or I-shaped profile. Other designs, for example a circular or quadrilateral profile, are also conceivable.

The accommodating pockets 72, 74, 76 are clamped onto the supporting crossmember 22, and this provides for adjustability in different dimensions. In addition to the clamping mechanism, it is also possible to realize other fastening mechanisms such as a form-fitting or friction-fitting mechanism, for example direct screw connection along with corresponding bores, or threaded bores, latching or adhesive bonding.

The accommodating pockets 72, 74, 76 contain guides 741, 742, which in the situation shown in FIG. 3 are evident only for the central accommodating pocket 74, and therefore will only be described in this respect. The guides 741, 742 are produced from a heat-resistant plastic, which provides for thermal insulation both between the accommodating pocket 74 and the transport cart 12, connected via the supporting crossmember 22, on the one hand, and the workpiece carrier 80 and the workpiece connected thereto, on the other hand. At the same time, the guides 741, 742 reduce the friction involved during plug-in and unplugging operations.

The workpiece carrier 80 has, as already mentioned, two supporting portions 80, 84 and also transverse carriers 86, 88, which are connected to the supporting portions. The transverse carriers 86, 88 are provided at their outer ends with accommodating points 861, 862, 881, 882. The workpiece or the workpieces, in this case, for example, a vehicle body, can be accommodated, and possibly fastened, at these accommodating points. As an alternative to the aforementioned embodiment of a thermal insulating means introduced within the accommodating pocket 74, it is also possible for the thermal insulating means to be fastened on the workpiece carrier such that the thermal insulating means forms the direct interface between a workpiece and the workpiece carrier 80. For example, it would be possible for the accommodating points 861, 862, 881, 882 to be produced from a thermally insulating material and/or to have a thermally insulating support.

The supporting portions 82, 84 are provided on their underside with a protective covering 821, 841. It would be possible for the unoccupied accommodating pocket 74 to be closed, if appropriate, by a dummy plug (not depicted).

The workpiece carrier 80 and the fastening device 70 interact as follows: depending on the type of workpiece which is to be conveyed in an installation, it is possible to adjust the position and the distance between, as well as the number of, the accommodating pockets 72, 74, 76 on the connecting device 20 and/or in the supporting crossmember 22. In the embodiment shown, three accommodating pockets 72, 74, 76 are provided. This number provides, for example, for a quick changeover from a workpiece carrier 80 which is designed for a relatively long workpiece (not depicted), and has a long distance between the supporting portions 82, 84 as shown in FIG. 3, to a workpiece (not shown) which has a shorter distance between the supporting portions 82, 84. For this shorter distance, it would be possible to uniquely adjust, for example, the central accommodating pocket 74. In this way, with a regular changeover between the aforementioned two distances between the supporting portions 82, 84, conveying operation would be possible without the need for any further outlay for conversion purposes. These workpiece carriers 80 can also be used for handling at other handling stations or for processing at other treatment stations.

Since it is possible for the accommodating pockets 72, 74, 76 to be removed, they are easy to clean and easy to change over for repair purposes. The conicity of the interior of the accommodating pockets 72, 74, 76 means that the plug-in system has a high level of accuracy. At the same time, connection is easy to establish and release. For this reason, the construction is also capable of being automated and is not sensitive to production-related inaccuracies. Each accommodating pocket 72, 74, 76 is adjustable. Of course, it is also possible to provide a smaller number of accommodating pockets, for example two or one, or a larger number of accommodating pockets than shown in the exemplary embodiments.

Figure 4:
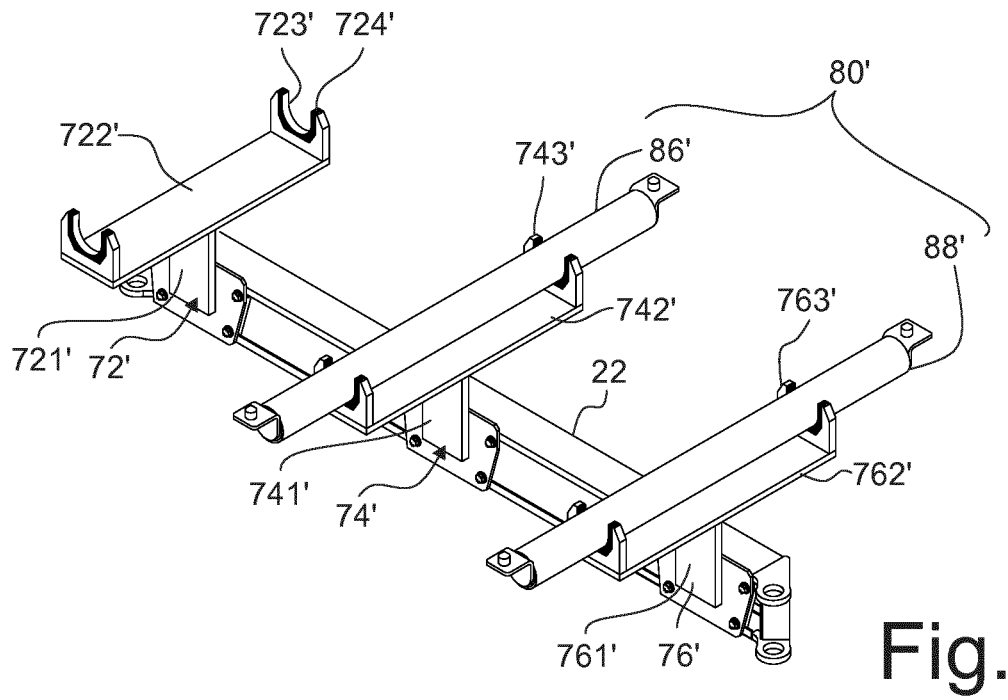
FIG. 4 shows a partial view, in perspective, of the transport cart from FIG. 3 with an alternative fastening device and with a second workpiece carrier inserted.

FIG. 4 shows a partial view, in perspective, of the transport cart 12 from FIG. 3 with an alternative fastening device 70' and with a second workpiece carrier 80', which is connected to the fastening device 70'. In order to avoid identical parts of the description being repeated, the text which follows will discuss only the differences inherent in this alternative embodiment. Features which are the same as, or comparable to, those from the preceding embodiment have been provided with the same reference signs and will not be given any further, separate explanation.

In contrast to the embodiment described in FIGS. 1-3, the embodiment which is shown in FIG. 4 replaces accommodating pockets with accommodating supports 72', 74', 76'. In a manner comparable to the accommodating pockets 72-76 from FIGS. 1-3, the accommodating supports 72'-76' are connected to the supporting crossmember 22 via a clamping connection or screw connection and thus can be correspondingly adjusted, released and changed over. Of course, some other type of fastening would also be possible, as already explained above.

The accommodating supports 72'-76' each have a supporting portion 721', 741', 761', which extends essentially vertically, but as an alternative, in a manner comparable to the supporting portions 82, 84 of the workpiece carrier 80, may also be in the form of a swan neck or tongue.

A respective transverse carrier 722', 742', 762' is located on the upper side of the accommodating supports 72'-76', as seen in the vertical direction, said transverse carrier having accommodating forks 732', 743', 763' at its outer ends. The inner side of the forks 732'-763' is coated with an insulating material 724', which impedes a flow of heat.

Figure 5:
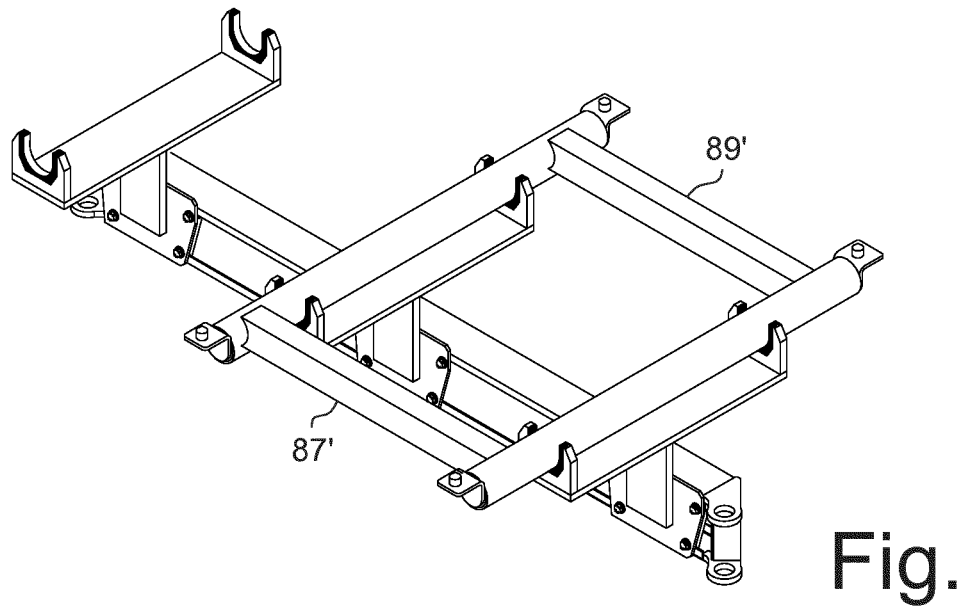
FIG. 5 shows a partial view, in perspective, of the transport cart from FIG. 4 with an alternative, third workpiece carrier inserted.

An appropriate workpiece carrier 80' can be positioned in the forks 723'-763', said workpiece carrier, in the exemplary embodiment shown in FIG. 4, comprising merely two transverse carriers 86', 88' having, in a manner analogous to the workpiece carrier 80 from FIGS. 1-3, mounts for a workpiece at the ends. It is also possible, as is shown in FIG. 5, for the transverse carriers 86', 88' to be connected to one another by means of longitudinal carriers 87', 89'.

The thermal insulating means for the forks 723'-763' provides for thermal insulation between the fastening device 70' and the workpiece carrier 80'.

Figure 6:
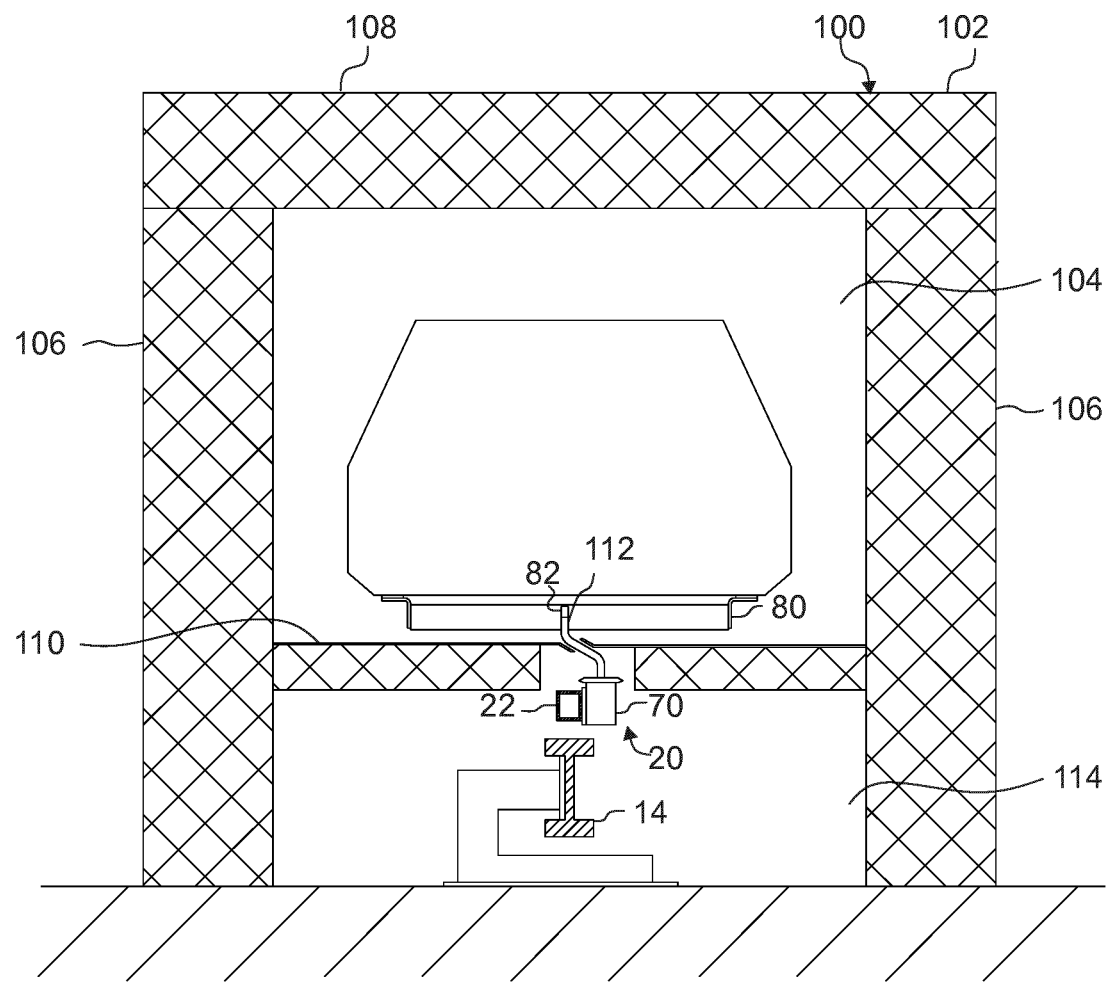
FIG. 6 shows a cross-sectional view of the transport system from FIG. 1 in conjunction with a drier.

FIG. 6 shows a cross-sectional view of the transport system 10 from FIGS. 1 and 2 in conjunction with a drier 100. The drier 100 comprises a housing 102 which, forming a temperature-control tunnel, bounds a drying tunnel 104 and comprises side walls 106, a ceiling 108 and a tunnel floor 110. The tunnel floor 108 has a connecting aperture 112, which complements the supporting portions 82, 84 of the transport cart 12. A travel space 114 for the transport system 10 is located beneath the drying tunnel 104.

Of the transport system 10, schematic illustrations are given merely of the rail 14 and of the connecting device 20, which in the present case is designed in the form of supporting crossmember 22. In the travel space 114, it is thus possible for the transport cart 12 to move along the direction of travel 16, running perpendicularly to the drawing surface of FIG. 6, and, in the process, to carry along the workpiece carrier 80, 80', which is connected to the transport cart 12 via the fastening device 70.

The supporting portions 82, 84, of which only one supporting portion 82 is shown in FIG. 6, pass through the connecting aperture 112 and can therefore also be referred to as through-passage portions.

It is undesirable for the high temperatures in the drying tunnel 104 to be transferred to the transport cart 12, and this scenario is made more difficult in the present invention by a thermal insulating means being present between the workpiece carrier 80 and transport cart 12. In the exemplary embodiment shown in FIG. 6, as explained in detail in relation to FIG. 3, this thermal insulating means is provided in the form of an insulating plastic element within the accommodating pockets 72-76. The geometrical configuration of the through-passage portion 82, together with the configuration of the connecting aperture 112, additionally impedes a flow of heat for example by thermal radiation. This further improves the thermal separation between the workpiece and workpiece carrier 80 and the transport cart 12.

What is claimed is:

1. A transport system comprising:
a multiplicity of transport carts, wherein the multiplicity of transport carts can be displaced in a transporting direction on a rail system and workpieces can be transported by means of the multiplicity of transport carts, wherein each transport cart has a chassis, wherein each transport cart has a fastening device, which is intended to establish a connection between the transport cart and a workpiece carrier in order for the workpiece carrier to be transported, and each fastening device comprises a plurality of fastening points, and each fastening point has a thermal insulating means, which impedes transfer of heat between the workpiece carrier and the transport cart.

2. The transport system as claimed in claim 1, wherein the thermal insulating means for each fastening device is a thermally insulating element between the workpiece carrier and the fastening device, between the fastening device and the transport cart and/or integrated in the fastening device.

3. The transport system as claimed in claim 1, wherein each fastening device has a through-passage portion.

4. The transport system as claimed in claim 1, wherein each fastening point is a plug-in connection.

5. The transport system as claimed in claim 4, wherein each plug-in connection has an accommodating space, which tapers downward.

6. The transport system as claimed in claim 5, wherein each plug-in connection has a thermally insulating element in a region of the accommodating space.

7. The transport system as claimed in claim 6, wherein the insulating element has friction-reducing properties.

8. The transport system as claimed in claim 1, wherein the rail system is a monorail system.

9. The transport system as claimed in claim 1, wherein the workpiece carrier is a skid for a vehicle body or a vehicle component.

* * * * *